L. O. LINDBERG.
SHOE AND FASTENER THEREFOR.
APPLICATION FILED JULY 10, 1908.
931,441.
Patented Aug. 17, 1909.
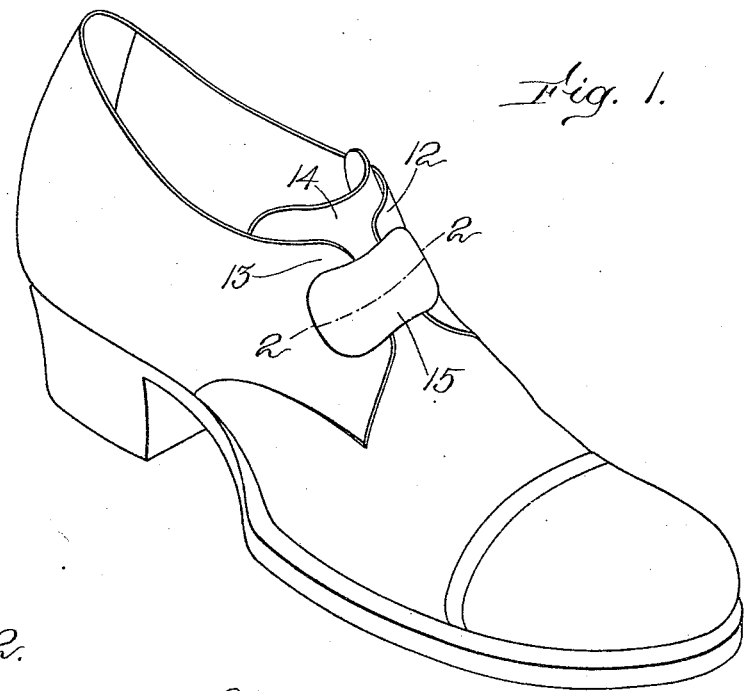
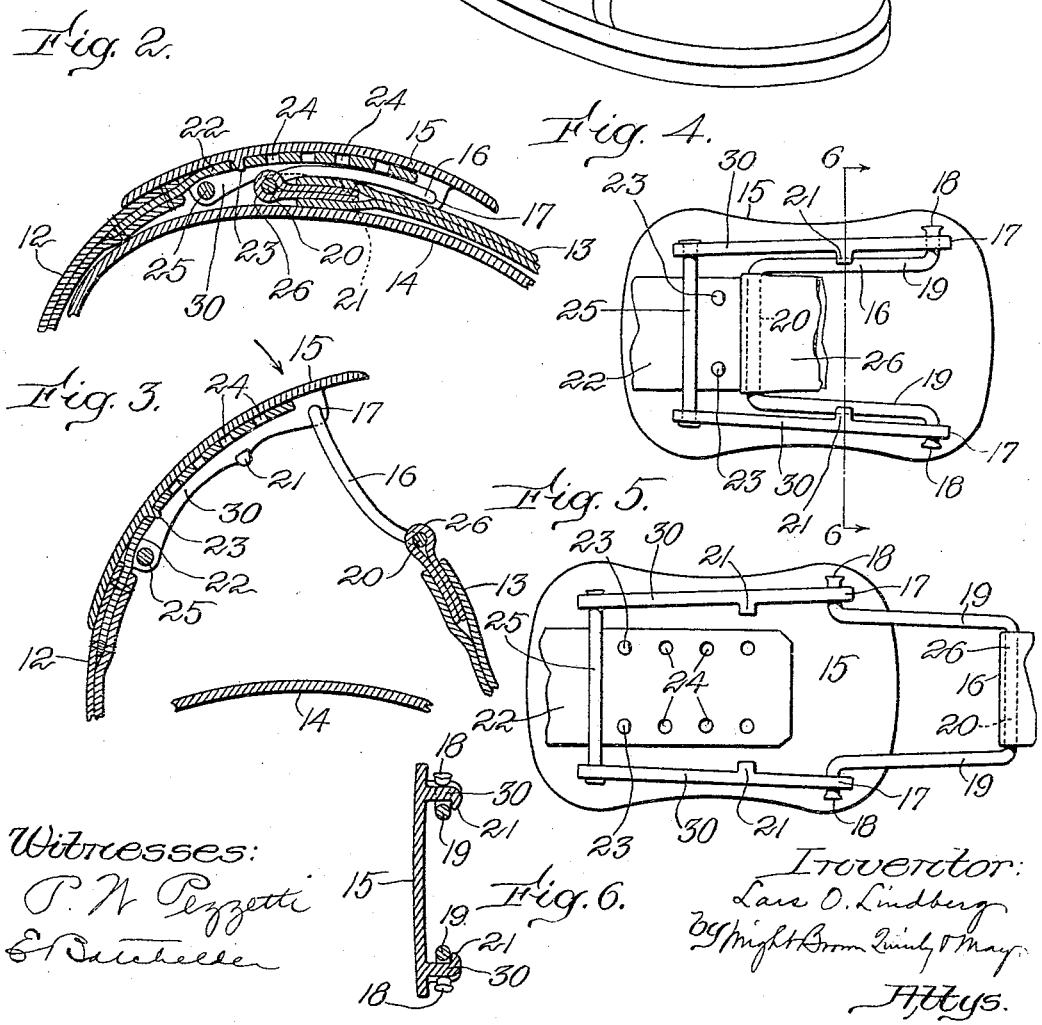

UNITED STATES PATENT OFFICE.

LARS O. LINDBERG, OF BROCKTON, MASSACHUSETTS.

SHOE AND FASTENER THEREFOR.

No. 931,441.     Specification of Letters Patent.     Patented Aug. 17, 1909.

Application filed July 10, 1908. Serial No. 442,851.

*To all whom it may concern:*

Be it known that I, LARS O. LINDBERG, of Brockton, in the county of Plymouth and State of Massachusetts, have invented certain new and useful Improvements in Shoes and Fasteners Therefor, of which the following is a specification.

This invention relates to shoes in which the forward end portions of the quarters constitute flaps which are detachably connected to secure the shoe to the foot.

The invention has for its object to provide improved means for quickly and securely confining the quarter flaps to fasten the shoe, and for releasing the said flaps to permit the removal of the shoe.

The invention consists in the improvements which I will now proceed to describe and claim.

Of the accompanying drawings, forming a part of this specification,—Figure 1 represents a perspective view of a shoe provided with a fastener embodying my invention. Fig. 2 represents a section on line 2—2 of Fig. 1, and showing the fastener contracted to fasten the shoe. Fig. 3 represents a view similar to Fig. 2, showing the fastener extended to release the shoe. Fig. 4 represents a view of the inner side of the fastener, showing it contracted. Fig. 5 represents a view of the inner side of the fastener showing it extended. Fig. 6 represents a section on line 6—6 of Fig. 4.

The same reference characters indicate the same parts in all the figures.

In the drawings, 12 and 13 represent the end portions or flaps of the quarters of a shoe, said flaps being here shown as overlapping the upper end portion of the camp 14. My invention is embodied in a fastener adapted to detachably connect the flaps 12 and 13, and hold them closed upon the instep, said fastener comprising two links 15 and 16, which are hinged together and adapted to be folded to contract the fastener and fasten the shoe, as shown in Figs. 1, 2, and 4, and to be extended to release the shoe, as shown in Figs. 3 and 5. The outer link 15 overlaps and conceals the inner link 16 when the fastener is contracted, said outer link then constituting the only visible portion of the fastener. The body portion of the outer link 15 is here shown as a plate which is curved to fit the curvature of the instep, said body portion being of any suitable form and design. It is here shown as a continuous curved plate, but it may obviously be made of more or less open construction, and adapted to be supplemented by a ribbon, or other piece of fabric, to ornament the fastener.

The outer end of the inner link portion is hinged to the outer end of the outer link 15, the form and arrangement of the links being such that the inner link may be folded against the outer link to move its inner end toward the inner end of the outer link, and thus contract the fastener, as shown in Fig. 2; and swung away from the outer link to extend the fastener, as shown in Fig. 3.

The hinge members of the outer link are preferably hinge sockets 17, projecting inwardly from the inner surface of the outer link at the outer end thereof. The inner link is preferably a loop of resilient wire, such as steel, having its ends bent outwardly to form hinge pintles 18, which are at the outer end of the inner link, and are engaged and movable endwise in the sockets 17, said loop including resilient side arms 19, and a cross bar 20 connecting said arms, and located at the inner end of the inner link, said cross bar constituting a hinge pintle member.

21, 21 represent a pair of hooks or detents formed on the outer link 15, between the sockets 17 and the inner end of the link, and projecting inwardly therefrom, said detents being arranged to engage the resilient side arms 19 of the inner link when the fastener is contracted, and thus lock the fastener in its contracted adjustment. When the inner link is swung from the position shown in Figs. 3 and 5 to that shown in Figs. 2 and 4, the side arms 19 in passing the detents 21 are sprung inwardly by the latter until they pass the detents and engage the same, as indicated in Fig. 6. Provision is thus made for securely locking the fastener in its contracted position, the employment of hardened resilient wire as the material of the inner link enabling said link to engage the detents 21 without excessive wear of either the side arms or the detents. The outer link and its detents 21 may be made integral with each other of any suitable metal, and may be cast, drop-forged, or otherwise formed.

The outer link 15 is provided at its inner end portion with suitable means for engaging one of the shoe parts to be connected, the said part, as here shown, being a strap 22 suitably secured to the quarter flap 12. The engaging means provided on the outer link comprise, in this embodiment of the invention, a pair of inwardly projecting studs 23 adapted to enter holes 24 in the strap 22, and a cross bar 25 adapted to confine the strap against the inner side of the outer link 15, and in engagement with the studs 23. The strap 22 may be provided with a plurality of holes 24 to permit endwise adjustments of the link 15 relatively to the strap 22, and quarter flap 12. The inner link 16 is also provided with means for engaging the opposite part of the shoe, said part being here shown as a strap secured to the quarter flap 13, and formed into a loop 26 embracing the cross bar 20, said loop constituting a hinge socket member.

The shoe being placed upon the foot with the fastener extended, as shown in Fig. 3, the contraction of the fastener may be effected by pressing the raised outer end of the outer link diagonally downward, as indicated by the arrow, this operation causing the fastener to fold to the position shown in Fig. 2, until the inner link is engaged and locked by the detents 21, the inner end of the inner link being thus moved toward the inner end of the outer link. The flaps 12 and 13 are thus brought into close proximity with each other, and the outer link is caused to lie upon the instep portion of the shoe, so that it conceals the inner link and all the other parts or members which contribute to the general result. To unfasten the shoe, it is only necessary to raise the outer end portion of the outer link which carries the hinge member 17, this operation permitting the flaps 12 and 13 to separate, as shown in Fig. 3. It is obvious that a plurality of fasteners of the described construction may be employed when the length of the quarter flaps 12 and 13 renders this desirable.

The hinge sockets 17 and the detents 21 are preferably parts of flanges 30 formed on the inner side of the outer link 15, the cross bar 25 being attached to said flanges and extending across the space between them. The hinge connection between the outer ends of the outer and inner links, and the adaptability of the inner end of the inner link to swing toward the inner end of the outer link and fold against the latter, this being permitted by the hinge connection between the inner end of the inner link and the flap or shoe part to which it is connected, permit a wide separation of the shoe parts 12 and 13 when the shoe is unfastened, as shown in Fig. 3, and an ample closing movement of said parts when the shoe is fastened as shown in Fig. 2, the locking members between the inner and outer ends of the links holding the fastener securely in its contracted adjustment.

I claim:

1. A shoe having a fastener comprising a rigid outer link engaged at its inner end portion with one of the quarter flaps, and an inner link hinged at its outer end to the outer end portion of the outer link, and hinged at its inner end to the other quarter flap, the inner link being adapted to be folded against the outer link to contract the fastener and move the engaged parts of the quarter flaps toward each other, the outer link being provided with rigid inwardly projecting detents between its end portions, while the inner link is provided with resilient members adapted to spring into engagement with said detents when the fastener is contracted.

2. A shoe fastener comprising a rigid outer link having hinge sockets at its outer end, means between said sockets and its inner end for engagement with one of the two shoe parts to be connected, and a pair of detents between said hinge sockets and its inner end, and an inner link composed of a resilient wire loop having end pintles at its outer end engaged with said sockets, side arms adapted to spring into engagement with the said detents to hold the fastener in a contracted adjustment, and means at its inner end for hinging it to the opposite shoe part.

3. A shoe fastener comprising a rigid outer link having hinge sockets at its outer end, means between said sockets and its inner end for engagement with one of the shoe parts to be connected, and a pair of detents between the hinge sockets and its inner end, and an inner link composed of a wire loop having end pintles at its outer end engaged with said sockets, resilient side arms adapted to engage said detents, and a cross bar at its inner end connecting said arms and constituting a hinge pintle member adapted to engage a hinge socket member on the opposite shoe part.

In testimony whereof I have affixed my signature, in presence of two witnesses.

LARS O. LINDBERG.

Witnesses:
NATHANIEL C. KING,
EMIL A. LARSON.